(12) United States Patent
Dietmayer

(10) Patent No.: US 6,418,388 B1
(45) Date of Patent: Jul. 9, 2002

(54) ARRANGEMENT FOR OFFSET COMPENSATION OF TWO ORTHOGONAL TEST SIGNALS

(75) Inventor: Klaus Dietmayer, Ulm (DE)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/545,784

(22) Filed: Apr. 7, 2000

(30) Foreign Application Priority Data

Apr. 9, 1999 (DE) .......................... 199 15 968

(51) Int. Cl.[7] .............................. G01C 17/38
(52) U.S. Cl. ........................... 702/95; 702/95; 702/94
(58) Field of Search ......................... 73/204; 702/72

(56) References Cited

U.S. PATENT DOCUMENTS

| | | | | |
|---|---|---|---|---|
| 4,794,794 A | * | 1/1989 | Djorup | 73/204 |
| 5,297,063 A | * | 3/1994 | Cage | 364/571.02 |
| 6,144,925 A | * | 11/2000 | Hofstetter | 702/72 |

FOREIGN PATENT DOCUMENTS

SE    WO 99/67722    * 12/1999

* cited by examiner

*Primary Examiner*—John S. Hilten
*Assistant Examiner*—Douglas N Washburn
(74) *Attorney, Agent, or Firm*—Steven R. Biren

(57) ABSTRACT

Offset compensation of two orthogonal sensor signals, which are supplied by two sensors and are preferably designed for angle measurements, occurs in dependence on the geometric arrangement of three pairs of test values of the sensor signals in a system of coordinates, the center of a circle on which the three pairs of test values are situated in the system of coordinates having center coordinates $\Delta x$ and $\Delta y$ relative to the origin of the system of coordinates, correction means are provided which perform a sign determination of the values $\Delta x$ and $\Delta y$ of the center coordinates of the circle in a repetitive cycle in each measuring cycle, while in each measuring cycle at least one of the pairs of test values differs from the pair of test values used in the preceding measuring cycle, and which means generate correction signals with which the sensor signals are complemented.

10 Claims, 2 Drawing Sheets

ARRANGEMENT FOR OFFSET COMPENSATION OF TWO ORTHOGONAL TEST SIGNALS

BACKGROUND OF THE INVENTION

The invention relates to an arrangement for offset compensation of two orthogonal sensor signals S(x) and S(y), which are supplied by two sensors (2, 3) and are preferably designed for angle measurements, the offset compensation taking place in dependence on the geometric arrangement of Free pairs of test values P1(x1, y1), P2(x2, y2) and P3(x3, y3) of the sensor signals S(x) and S(y) in a system of coordinates, the center of a circle on which the three pairs of test values P1(x1, y1), P2(x2, y2) and P3(x3, y3) are situated in the system of coordinates having center coordinates Δx and Δy relative to die origin of the system of coordinates.

Many known measuring systems determine the test quantity to be measured from two test signals x and y which are mutually orthogonal, i.e. show a mutual phase shift of 90°. The one measuring channel thus generates a test quantity proportional to the sine of the quantity to be ascertained and the other a signal proportional to the cosine of said quantity. Such an arrangement renders possible, for example, the calculation of an angle in angle measurement systems. A change in the value of the signal amplitude is unimportant here as long as this amplitude changes in an identical fashion with temperature or owing to other influences in both channels, Nevertheless, so-called offsets adversely affect the measuring accuracy. These offsets may be regarded as superimposed DC voltage or current signals, which are to be reduced to a minimum. The offset compensation in the manufacture of the sensors is an intricate matter and is avoided. Instead, it is attempted to carry out an offset compensation in the application surroundings.

U.S. Pat. No. 5,297,063 discloses an arrangement for this purpose which carries out an on-line compensation of the offsets in that the center is calculated of a circle on which three test value pairs are situated. This circle center can be calculated from known geometric relations. A disadvantage of this arrangement is that the procedure is comparatively complicated and that a microprocessor is required.

SUMMARY OF THE INVENTION

It is an object of the invention to provide an arrangement with an offset compensation which is as simple as possible.

According to the invention, this object is achieved in that correction means are provided which carry out a sign determination of the values Δx and Δy of the center coordinates of the circle on which the three pairs of test values P1(x1, y1), P2(x2, y2) and P3(x3, y3) are situated in a repetitive cycle in each measuring cycle, while in each measuring cycle at least one of the pairs of test values differs from the pair of test values used in the preceding measuring cycle, and which means generate correction signals Kx and Ky with which the sensor signals S(x) and S(y) are complemented, in that the correction means in every measuring cycle increase or decrease the offset correction signal Kx by a correction value KWx compared with the offset correction signal Kx of the previous measuring cycle in dependence on the sign of the center coordinate Δx , and in that the correction means in every measuring cycle in a similar manner increase or decrease the offset correction signal Ky by a correction value KWy compared with the offset correction signal Ky of the previous measuring cycle in dependence on the sign of the center coordinate Δy.

The arrangement according to the invention bases its operation on the geometric relationships, i.e. that the three pairs of test values derived from the test signals S(x) and S(y) lie on a circle whose center characterizes the offsets Δx and Δy of the two sensor signals S(x) and S(y). The arrangement according to the invention does not carry out an exact calculation of the offsets Δx and Δy, so as to keep the expenditure as small as possible. Instead, only the signs of the values of Δx and Δy are determined, which is substantially easier to do and which nevertheless allows for a very good correction. This is achieved in that a correction is carried out in each measuring cycle for three pairs of test values each time, so that the amount of correction required for the values Δx and Δy becomes smaller at each correction operation and Δx and Δy are adjusted to as small values as possible, depending on the chosen step size of the change, whereby an optimized offset compensation is obtained.

Correction means are for this purpose provided in the arrangement which carry out a sign determination of the values of Δx and Δy in a cyclical manner. Δx and Δy here form the center coordinates of that circle on which the three test value pairs P1(x1, y1), P2(x2, y2) and P3(x3, y3) are situated, which pairs should have been previously determined, and one test value pair at least should be different from the test value pair used in the previous measuring cycle.

The correction means further generate offset correction signals Kx and Ky which are superimposed on the sensor signals S(x) and S(y). The sensor signals S(x) and S(y) are thus corrected by means of the offset correction signals Kx and Ky, so that an offset compensation of these signals is achieved.

This is done in the same manner for the two offset correction signals, but independently of one another. First the said sign of the center coordinate Δx is thus determined for the purpose of the offset correction signal Kx in each measuring cycle for the three pairs of test value P1(x1, y1), P2(x2, y2) and P3(x3, y3). Depending on this sign, the offset correction signal kx is then increased or decreased by a correction value KWx, depending on the sign which was determined. The offset correction signal Kx starts from that of the preceding cycle, i.e. the offset correction signal Kx is increased or decreased by the correction value KWx in each cycle in dependence on the value of the center coordinate Δx determined in that cycle. In this manner the offset correction signal Kx is increased or decreased in each cycle such that the value of the center coordinate Δx decreases continually and approaches a minimum, the value of which depends on the value of the chosen correction value KWx. This is an iterative process in which an offset compensation takes place in several measuring steps, i.e. several measuring cycle periods, which process is close to optimal and nevertheless requires very little expenditure, because a determination of the sign of the values of Δx is sufficient.

The procedure for obtaining the offset compensation for the signal S(y) corresponds to the procedure described with reference to the sensor signal S(x); however, the offset compensation for both signals is carried out mutually independently.

The change in the value of the offset correction signal Kx by the correction value KWx applied in each cycle may advantageously be inexpensively provided by means of two integrators. The integrators then merely receive a signal in each cycle indicating whether a change in the offset correction signals by an upward correction value or by a downward correction value is to be applied, whereupon the previously integrated values forming the offset correction signals of the previous cycle are increased or decreased by the new correction value.

The correction values KWx and KWy may have programmable levels, as is provided for in a further embodiment of the invention as defined in claim 3. The value may then be differently programmed, for example, in dependence on the field of application.

If the correction values KWx and KWy have the same value in every cycle, then a correction of the offset compensation can only be applied by that value in each cycle. If a faster offset compensation is desired or required in certain cases, it is advantageous not to choose the values of KWx and KWy to be constant but to make them dependent on the sign found for the two center coordinates Δx and Δy in the previous cycle and on the correction values KWx and KWy chosen in the previous cycle. This is implemented such that, for example, the correction value KWx is doubled in a measuring cycle n if in the preceding measuring cycle n−1 the same sign was determined for the center coordinate Δx as in the present cycle n. It is recognized thereby that the offset compensation as regards the sensor signal S(x) has to take place in the same direction, i.e. with the same sign, as in the previous cycle run. The correction value KWx may then be advantageously doubled because it may be assumed that a greater offset correction is required in the same direction. This process will repeat itself until the sign of the coordinate Δx changes, whereupon a return is made to the original value of KWx, which may be a fixed or a programmable value. The offset compensation correction process is speeded up as a result of this whenever an offset error of the signal of S(x) with the same sign is detected in several consecutive cycles. Obviously, the procedure for the signal S(y) is the same, again independent of the correction of the signal S(x), i.e. the changes in the values KWx and KWy are applied independently of one another.

To obtain a sufficient accuracy of the center coordinates Δx and Δy and thus also of the offset compensation, the three pairs of test values P1(x1, y1), P2(x2, y2) and P3(x3, y3) shall fulfill certain geometric requirements which have the result that the determination of the sign of the center coordinates Δx and Δy is possible with a sufficient accuracy.

According to a further embodiment of the invention, the offset correction signals Kx and Ky may be advantageously limited by means of limiters so that they cannot assume random values. The limiting action prevents the algorithm from diverging owing to signal errors which persist for longer periods.

In combination with the variable correction values KWx and KWy, it may be provided that the correction values KWx and KWy are reset to their initial values when the limit value is reached.

The limit values for the limitation may be set when the arrangement is initialized.

Setting of the start values of the offset Correction signals Kx and Ky may also be carried out during such an initialization.

Other embodiments indicate in concrete terms for the adjustment of the sensor signals S(x) and S(y) in further embodiments of the invention how a sign determination may be carried out on the three pairs of test values P1(x1, y1) P2(x2, y2) and P3(x3, y3) in a comparatively simple manner by means of concrete equations indicated in the claims. A coordinate transform is carried out for determining the sign of the center coordinate Δy because in this manner similar equations can be used for determining the sign of Δy to those used for determining the sign of Δx. It suffices to enter the relevant coordinate values of the pairs of test values in the equations; for the rest the equations are the same for the two center coordinates Δx and Δy owing to the transform.

BRIEF DESCRIPTION OF THE DRAWING

An embodiment of the invention will now be explained in more detail with reference to the drawing, in which.

DESCRIPTION OF THE PREFERRED EMBODIMENT

Figure 1:
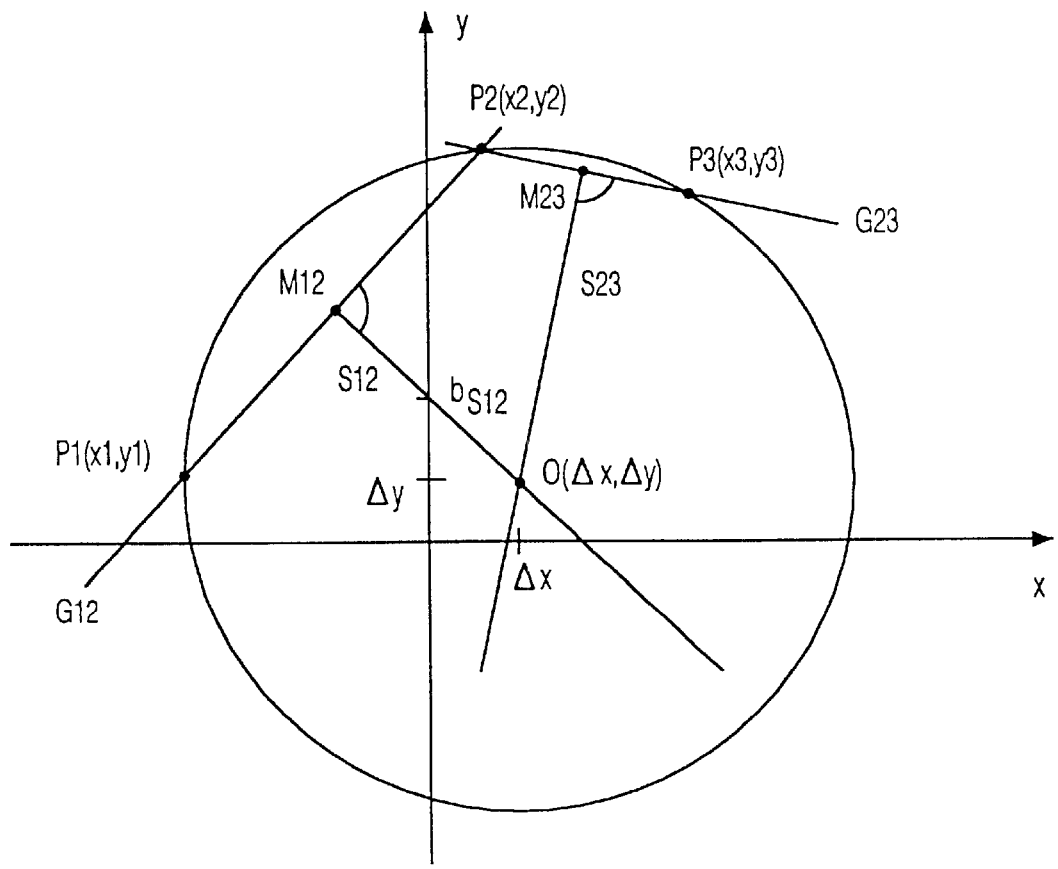
FIG. 1 represents a cartesian system of coordinates with three pairs of test values P1(x1, y1), P2(x2, y2) and P3(x3, y3) entered therein and with a geometric determination of the center coordinates Δx and Δy in the system of coordinates.

FIG. 1 shows a cartesian system of coordinates x/y in which three pairs of test values P1(x1, y1), P2(x2, y2) and P3(x3, y3) have been entered. This representation is to be interpreted such that the values of the sensor signals signals S(x) and S(y) are determined at a given moment t1 so that the value P1(x1, y1) is obtained in the system of coordinates x/y. Since the sensor signals used S(x) and S(y) are mutually perpendicular, they can be written as follows:

$$x = A \cdot \cos(\alpha) \qquad 1$$

$$y = A \cdot \sin(\alpha) \qquad 2$$

In these equations, α is the quantity to be calculated, i.e. for example the angle to be determined. The amplitude A of the signals is not essential for the calculation of the test values, provided A is identical in equations 1 and 2.

When the pairs of test values are plotted in a cartesian system of coordinates as in FIG. 1, they will define a circle. The radius of this circle depends on the amplitude A and may accordingly be temperature-dependent. The quantity to be found is independent of A because it is true that:

$$\alpha = \arctan y/x \qquad 3$$

Problems now arise, however, when one of the two signals contains a DC component, i.e. an offset, because the equations given above are no longer true then and an evaluation in accordance with equation 3 would lead to an erroneous result.

Such a case is exemplified in FIG. 1, where the three pairs of test values P1(x1, y1), P2(x2, y2) and P3(x3, y3) represent any test values of the sensor signals S(x) and S(y) for which at least one pair of test values is to be determined anew in each cycle of the offset correction. The picture of FIG. 1 shows that the three pairs of test values lie on a circle in accordance with the relationship described above. The determination of the center of this circle and the coordinates Δx and Δy thereof in the cartesian system of coordinates can be carried out very simply in that the respective mid-perpendiculars S12 and S23 of the connecting line G12 between the points P1(x1, y1) and P2(x2, y2) and of the connecting line G23 between the points P2(x2, y2) and P3(x3, y3) are formed. The point of intersection of these mid-perpendiculars S12 and S23 forms the circle center with the coordinates Δx and Δy. These coordinates Δx and Δy are the offset for the two sensor signals.

A direct calculation, however, of the exact values of the center coordinates Δx and Δy is very laborious and is avoided according to the invention in that only the sign of each of the relevant center coordinates Δx or Δy is determined.

This is achieved in a measuring cycle which repeats itself. In each new measuring cycle run, new test value pairs P1(x1, y1), P2(x2, y2) and P3(x3, y3) are obtained for the calculation of the signs of the coordinates $\Delta x$ and $\Delta y$; at least one of these three pairs of test values should be new compared with the pairs of test values used in the preceding cycle.

It will now be explained how the sign of the center coordinates $\Delta x$ and $\Delta y$ can be determined on the basis of the geometric or mathematical interrelations of the three pairs of test values P1(x1, y1), P2(x2, y2) and P3(x3, y3).

The center M12 of the connecting line G12 between the pairs of test values P1(x1, y1) and P2(x2, y2) and the center M23 of the connecting line G23 between the two pairs of test values P2(x2, y2) and P3(x3, y3) can be calculated from:

$$x_{M12} = \frac{x_1 + x_2}{2}, \quad y_{M12} = \frac{y_1 + y_2}{2} \qquad 4.1$$

$$x_{M23} = \frac{x_2 + x_3}{2}, \quad y_{M23} = \frac{y_2 + y_3}{2} \qquad 4.2$$

It holds for the slope of the straight line G12 that:

$$\alpha_{G12} = \frac{y_2 - y_1}{x_2 - x_1} \qquad 5$$

Since the mid-perpendicular S12 is perpendicular to the line G12, it is true for the slope of the mid-perpendicular that:

$$\alpha_{S12} = -\frac{x_2 - x_1}{y_2 - y_1} \qquad 6$$

The y-axis intercept $b_{S12}$ now remains for a full determination of the line equation of the mid-perpendicular S12. Using the known point M12 on the connecting line, it results from the general line equation:

$$b_{S12} = y - a_{S12}x = y_{M12} - a_{S12}x_{M12} = \frac{y_1 + y_2}{2} + \frac{x_2 - x_1}{y_2 - y_1} \cdot \frac{x_1 + x_2}{2} \qquad 7$$

The use of the values $a_{S12}$ and $b_{S12}$ known by now results in the line equation:

$$y = a_{S12}x + b_{S12} = \frac{x_2 - x_1}{y_2 - y_2}\left(-x + \frac{x_1 + x_2}{2}\right) + \frac{y_1 + y_2}{2} \qquad 8$$

Similarly, the following line equation is obtained for the mid-perpendicular S23:

$$y = a_{S23}x + b_{S23} = \frac{x_3 - x_2}{y_3 - y_2}\left(-x + \frac{x_2 + x_3}{2}\right) + \frac{y_2 + y_3}{2} \qquad 9$$

with the values:

$$a_{S23} = -\frac{x_3 - x_2}{y_3 - y_2} \qquad 9.1$$

$$b_{S23} = \frac{y_2 + y_3}{2} + \frac{x_3 - x_2}{y_3 - y_2} \cdot \frac{x_2 + x_3}{2} \qquad 9.2$$

By equating the two results for the mid-perpendicular S12 and the mid-perpendicular S23 one obtains the point of intersection of the two lines with the coordinates $\Delta x$ and $\Delta y$:

$$\Delta x = \frac{b_{S23} - b_{S12}}{a_{S12} - a_{S23}} \qquad 10$$

$$\Delta y = \frac{a_{S23}b_{S12} - a_{S12}b_{S23}}{a_{S23} - a_{S12}} \qquad 11$$

It is accordingly true for the center coordinate $\Delta x$ that it is >0 if the sign of the numerator of the fraction of equation 10 is equal to the sign of its denominator. If these signs are different, then $\Delta x<0$.

This determination of the sign is sufficient already for the offset compensation arrangement according to the invention.

The determination of the sign from the equation 11, however, would seem to be more complicated. It is accordingly advantageous to carry out a coordinate transform in such a manner that an interchange of the coordinate axes takes place. The following transform condition holds here:

$$KS\{x,y\} \rightarrow KS\{y',x'\}.$$

Since in principle the coordinate axes and accordingly also the accompanying x- and y-values of the pairs of test values are interchanged here, the following equation results for $\Delta y$:

$$\Delta y = \frac{b'_{S23} - b'_{S12}}{a'_{S12} - a'_{S23}} \qquad 16$$

and with the substituted equation values:

$$a'_{S12} = -\frac{y_2 - y_1}{x_2 - x_1} \qquad 12$$

$$b'_{S12} = \frac{x_1 + x_2}{2} + \frac{y_2 - y_1}{x_2 - x_1}y_2 + \frac{y_1}{2} \qquad 13$$

$$a'_{S23} = -\frac{y_3 - y_2}{x_3 - x_2} \qquad 14$$

$$b'_{S23} = \frac{x_2 + x_3}{2} + \frac{y_3 - y_2}{x_3 - x_2} \cdot \frac{y_3 + y_2}{2}. \qquad 15$$

The determination of the sign of $\Delta y$ can thus also be achieved through determination of the sign of the fraction in the equation for $\Delta y$. It is true again that $\Delta y$ is greater than or equal to zero if the sign of the numerator of the fraction is equal to the sign of the denominator. If the signs of the two expressions are unequal, then $\Delta y <0$.

This method entails the advantage that the equations for $\Delta x$ and $\Delta y$ have the same fundamental build-up and accordingly the two values can be determined in the same way; it suffices to substitute different coordinate values for the three pairs of test values P1(x1, y1), P2(x2, y2) and P3(x3, y3) in the equations.

The arrangement according to the invention determines the signs of $\Delta x$ and $\Delta y$ in accordance with these equations in each cycle and modifies the sensor signals S(x) and S(y) with offset correction signals Kx and Ky whose values are dependent in each cycle on the signs of the values of $\Delta x$ and $\Delta y$ as determined in the relevant cycle. A reduction in the values of $\Delta x$ and $\Delta y$ is thus achieved in each cycle run, so that the offset is minimized.

This will be explained in more detail below with reference to FIG. 2, which shows at one side an arrangement for determining an angle in which again an arrangement for offset compensation according to the invention is provided.

Figure 2:
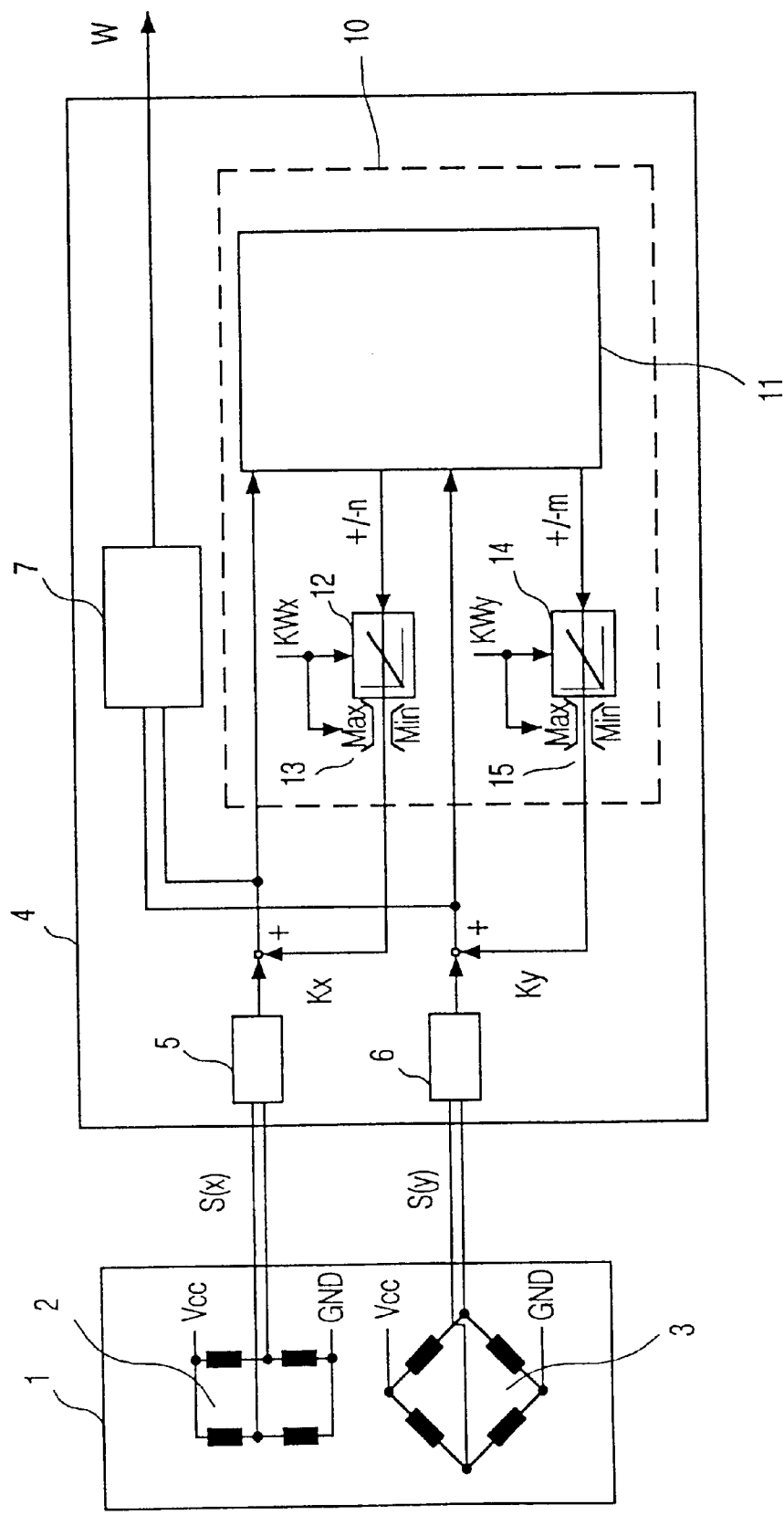
FIG. 2 shows an arrangement for calculating an angle from two sensor signals S(x) and S(y) of two sensors with an arrangement for offset compensation of these sensor signals according to the invention.

FIG. 2 shows these arrangements in the form of a block diagram. A sensor device 1 is again provided which comprises two sensors 2 and 3 which in their turn again comprise four sensor elements each which are arranged in the form of a measuring bridge. The two sensors 2 and 3 are mutually positioned such that they supply mutually orthogonal sensor signals S(x) and S(y). The signals S(x) and S(y) are accordingly shifted 90° in phase relative to one another.

The sensor signals S(x) and S(y) are suppied to an angle determination device 4. In the device 4, the sensor signal S(x) is supplied to an Analog/Digital converter 5 and the sensor signal S(y) is supplied to an Analog/Digital converter 6. Angle calculation means 7 determine the desired angle α from the interrelations explained above with reference to FIG. 1 for these digitized sensor signal values S(x) and S(y).

The means 7 supply a signal W which indicates this angle α.

As was explained above, it is a condition for an optimized accuracy of the angle measurement that the sensor signals S(x) and S(y) should contain no offset, i.e. no DC component.

To minimize any DC component present in the sensor signals S(x) and/or S(y), an arrangement for offset compensation according to the invention with correction means 10 is provided in the device 4.

The correction means 10 comprise a control 11 which is supplied with the digitized sensor signals S(x) and S(y).

The correction means 10 generate at their output offset correction signals Kx and Ky which are superimposed on the digitized sensor signals S(x) and S(y). An offset correction is thus carried out on the digitized sensor signals S(x) and S(y), so that the angle calculation means can determine the angle value W without error. The correction means 11 operate independently of the angle calculation means 7 during this and carry out the offset corrections cyclically.

In each cycle, the correction means 11 first collect the coordinate values of three pairs of test values which are derived from the digitized sensor signals S(x) and S(y). The coordinates of the three test values P1(x1, y1), P2(x2, y2) and P3(x3, y3) are accordingly collected. These test values may be any at all in principle, but they should not lie too close together on the circle indicated in FIG. 1; in addition, at least one of these three test values should be different from the test value pairs used in the previous cycle. The following criterion may be considered for this, for example, i.e. that the straight lines G12 and G23 of FIG. 1 should enclose an angle of at least 5°, or preferably 10° with one another.

After the control 11 in the correction means 10 has collected the values of these three pairs of test values, the signs of Δx and Δy can be determined from the equations given above. This is done in the control 11. The process is carried out on the basis of the geometric relations and the equations elucidated above.

This sign determination completed, the control 11 supplies signals in accordance with the ascertained signs to integrators 12 and 14. The integrators 12 and 14 supply offset correction signals Kx and Ky, respectively, at their outputs. Limiters 13 and 15 may be connected to the outputs of the integrators 12 and 14, respectively, limiting the offset correction signals and resetting the offset correction signals Kx and Ky to target values or initial values upon reaching of the relevant limit values.

As was explained above, the control 11 gives a signal, which corresponds to the sign of the value Δx found, to the integrator 12 in each new cycle run based on three pairs of test values P1(x1, y1), P2(x2, y2) and P3(x3, y3), of which at least one is new. The integrator 12 first delivers the offset correction signal Kx which was formed through integration over the preceding cycle runs. If, for example, it is found for a present cycle run n that the value Δx≧0, a corresponding signal will be given to the integrator 12, and the value of the offset correction signal Kx of the preceding cycle will be increased by a correction value KWx by the integrator 12.

The value of the offset correction signal Kx is accordingly KWx higher in the next cycle. Similarly, the value of the offset correction signal Kx is decreased by the correction value KWx if the control 11 detects that Δx≦0. d this manner the offset correction signal is continually increased or decreased by the correction value KWx in every cycle, depending on the sign of Δx. It is achieved thereby that the value of Δx is minimized, which in fact comes down to an offset compensation of this signal, i.e. the sensor signal S(x). The control 11 and the integrator 14 carry out an offset correction of the signal S(y) on the basis of the sips of Δy in a corresponding manner.

It is to be noted here that the offset corrections of the two sensor signals S(x) and S(y) take place independently of one another, so that the determinations of the signs of Δx and Δy are equally mutually independent, as are the operations of the integrators 12 and 14.

As was stated above, the integrators 12 and 14 may have respective limiters 13 and 15 connected downstream of them which limit the offset correction signals Kx and Ky. In addition, it may be provided that the limiters 13 and 15 reset the integrators 12 and 14 upon reaching of the limits, with the result that the integration process taking place in each cycle for generating the correction signals Kx and Ky resumes at its starting value. This makes sense because it may be assumed that the system has become permanently disturbed when the limit values are reached, so that a reset is called for.

The above description was based on the situation in which the value of, for example, the offset correction signal Kx is increased or decreased by the value KWx and that the value of KWx is always the same. This value KWx may be fixedly programmed and may depend on the application in which it is used.

Alternatively, however, the correction value KWx may also be dynamically chosen in dependence on its prior history. In that case the value of KWx is doubled in a cycle n if in the preceding cycle n–1 the same sign was found for the coordinate Δx as in the present cycle. This makes sense because it is clear that, if the same value was found for Δx in two consecutive cycles, an offset correction must take place in the same direction in both cycles. This means with a high degree of probability that there is a comparatively great offset correction error in this direction, so that it is useful to increase the step size with which the offset correction signal K(x) is modified in this direction. Advantageously, the correction value KWx may be doubled as compared with that of the previous cycle in every cycle in which the same sign of Δx is found as in the previous cycle. This doubling is kept up until the sign of Δx changes. When a sign change is detected, the last correction step KWx, which was too great, is undone in the next step. The process is continued then with the smallest correction value again.

This doubling may be achieved in the representation of FIG. 2 in that, for example, the control 11 delivers a relevant signal to the integrator 12, which then includes the correction value KWx a corresponding number of times in the integration process.

The offset correction compensation of the signal S(y) obviously takes place in an analogous manner, as does the operation of the control 11 and of the integrator 14 with respect to the offset correction of this signal in dependence on the sign of the center coordinate Δy.

In this case a comparison of the sign of the instantaneous center coordinate Δx or Δy, as applicable, with the sign of the relevant coordinate in the preceding cycle is carried out in each cycle, and a respective signal is given to the integrator 12 or 14.

It is achieved by means of the arrangement according to the invention that the sensor signals S(x) and S(y) are corrected independently of one another by the offset correction signals Kx and Ky as regards any offset or DC component which may be present, so that the angle calculation means 7 can optimally carry out an angle calculation. The procedure is comparatively simple because it is sufficient to determine the signs of the center coordinates Δx and Δy, and the control 11 supplies control signals to the integrators 12 and 14 in dependence on the signs found, duly correcting the integrated offset correction signals Kx and Ky on the basis of the ascertained signs of Δx and Δy in every cycle.

In particular, no complicated, accurate determination of the values of Δx and Δy, possibly involving microprocessors or the like, need be carried out in the arrangement according to the invention. The arrangement can thus be kept simple without substantial disadvantages for the offset compensation having to be taken into the bargain.

What is claimed is:

1. An arrangement for offset compensation of two orthogonal sensor signals S(x) and S(y), which are supplied by two sensors (2,3) and are preferably designed for angle measurements, the offset compensation taking place in dependence on the geometric arrangement of three pairs of test values P1(x1, y1), P2(x2, y2) and P3(x3, y3) of the sensor signals S(x) and S(y) in a system of coordinates, the center of a circle on which the three pairs of test values P1(x1, y1), P2(x2, y2) and P3(x3, y3) are situated in the system of coordinates having center coordinates Δx and Δy relative to the origin of the system of coordinates, characterized in that correction means (10) are provided which carry out a sign determination of the values Δx and Δy of the center coordinates of the circle on which the three pairs of test values P1(x1, y1), P2(x2, y2) and P3(x3, y3) are situated in a repetitive cycle in each measuring cycle, while in each measuring cycle at least one of the pairs of test values differs from the pair of test values used in the preceding measuring cycle, and which means (10) generate correction signals Kx and Ky with which the sensor signals S(x) and S(y) are complemented, in that the correction means (10) in every measuring cycle increase or decrease the offset correction signal Kx by a correction value KWx compared with the offset correction signal Kx of the previous measuring cycle in dependence on the sign of the center coordinate Δx, and in that the correction means (10) in every measuring cycle in a similar manner increase or decrease the offset correction signal Ky by a correction value KWy compared with the offset correction signal Ky of the previous measuring cycle in dependence on the sign of the center coordinate Δy.

2. An arrangement as claimed in claim 1, characterized in that two integrators (12, 14) are provided by means of which in each cycle the offset correction signals Kx and Ky of the previous cycle are increased or decreased by the respective correction values KWx and KWy of the present cycle.

3. An arrangement as claimed in claim 1, characterized in that the correction values KWx and KWy have a constant, programmable value.

4. An arrangement as claimed in claim 1, characterized in that the correction means (10) double the correction value KWx in a cycle if in the preceding cycle the center coordinate Δx had the same sign as in the present cycle, and in that they double the correction value KWy in a cycle if in the preceding cycle the coordinate Δy had the same sign as in the present cycle.

5. An arrangement as claimed in claim 1, characterized in that the correction means (10) only involve those pairs of test values P1(x1, y1), P2(x2, y2) and P3(x3, y3) in the offset correction signal calculation of which straight lines G12 and G23 interconnecting said three pairs of values P1(x1, y1), P2(x2, y2) and P3(x3, y3) in the system of coordinates enclose an angle of at least 5 degrees with one another.

6. An arrangement as claimed in claim 1, characterized in that limiters (13, 15) are provided which limit the values of the offset correction signals Kx and Ky to programmed or programmable limit values.

7. An arrangement as claimed in claim 6, characterized in that an initialization, in which the limit values are set, is carried out each time the arrangement is started.

8. An arrangement as claimed in claim 1, characterized in that an initialization, in which the correction means perform a setting of the start values of the offset correction signals Kx and Ky, is carried out each time the arrangement is started.

9. An arrangement as claimed in claim 1, characterized in that the correction means (10) carry out the determination of the sign of the center coordinate Δx of the three pairs of test values P1(x1, y1), P2(x2, y2) and P3(x3, y3) in accordance with the decision equations:

$$\Delta x \geq 0 \text{ if: Sign}\{(b_{S23}-b_{S12})\}=\text{Sign}\{(a_{S12}-a_{S23})\}$$

$$\Delta x < 0 \text{ if: Sign}\{(b_{S23}-b_{S12})\} \neq \text{Sign}\{(a_{S12}-a_{S23})\}$$

for which it is true that:

$$a_{S23} = -\frac{x3-x2}{y3-y2},$$

$$b_{S12} = \frac{y1+y2}{2} + \frac{x2-x1}{y2-y1} \cdot \frac{x1+x2}{2}$$

and $$a_{S12} = -\frac{x2-x1}{y2-y1},$$

$$b_{S23} = \frac{y2+y3}{2} + \frac{x3-x2}{y3-y2} \cdot \frac{x2+x1}{2}.$$

10. An arrangement as claimed in claim 1, characterized in that the correction (10) carry out the determination of the sign of the center coordinate Δy of the three pairs of test values P1(x1, y1), P2(x2, y2) and P3(x3, y3) in a transformed system of coordinates KS' with the transform equation:

$$KS\{x,y\} \rightarrow KS\{y', x'\}$$

in accordance with the decision equations:

$$\Delta y \geq 0 \text{ if: Sign}\{(b'_{S23}-b'_{S12})\}=\text{Sign}\{(a'_{S12}-a'_{S23})\}$$

$$\Delta y < 0 \text{ if: Sign}\{(b_{S23}-b'_{S12})\} \neq \text{Sign}\{(a'_{S12}-a'_{S23})\}$$

for which it is true that:

$$a'_{S12} = -\frac{y2-y1}{x2-x2},$$

$$a'_{S23} = -\frac{y3-y2}{x3-x2},$$

$$b'_{S12} = \frac{x1+y2}{2} + \frac{y2-y1}{x2-x1} \cdot \frac{y1+y2}{2}$$

and $$b'_{S23} = \frac{x2+x3}{2} + \frac{y3-y2}{x3-x2} \cdot \frac{y2+y1}{2}.$$

* * * * *